United States Patent Office 3,272,780
Patented Sept. 13, 1966

3,272,780
COPOLYMERS OF TRIOXANE, ANOTHER ALDEHYDE HAVING AT LEAST TWO CARBON ATOMS AND OPTIONALLY A THIRD COMONOMER
Walter Wilson and Herbert May, Birmingham, England, assignors to British Industrial Plastics Limited, London, England, a corporation of Great Britain
No Drawing. Filed Oct. 13, 1961, Ser. No. 144,843
Claims priority, application Great Britain, Oct. 17, 1960, 35,584/60
16 Claims. (Cl. 260—73)

The present invention relates to novel polymeric products which can be obtained from trioxan and to the preparation of these polymeric products.

It has been discovered that valuable polymeric products can be made by reacting trioxan with aldehydes substantially in the absence of moisture and in the presence of electrophilic catalyst.

Accordingly, the present invention provides a process for the preparation of valuable polymeric products which comprises reacting trioxan under substantially anhydrous conditions in the presence of an electrophilic catalyst with at least one aldehyde.

Particularly valuable polymeric materials are obtained using aldehydes containing electro-negative substituents. For instance, halogenated aliphatic aldehydes such as chloral and aromatic aldehydes such as benzaldehyde, anisaldehyde and cinnamaldehyde may usefully be used.

Valuable products may also be obtained by reacting trioxan with at least one aldehyde and at least one other compound capable of copolymerising with trioxan in the presence of an electrophilic catalyst. Examples of particularly suitable compounds which can be reacted with trioxan and one or more aldehydes in accordance with the present invention are the cyclic ethers disclosed in French patent specification No. 1,221,148, and the compounds which are disclosed in our co-pending U.K. patent application Nos. 24,184/60, 31,851/60, 40,020/60, 8,169/61, 8,378/61, 19,197/61, 21,567/61 and 21,568/61 as suitable for use in preparing polymeric products by reaction with trioxan.

The cognate complete specification filed on our co-pending U.K. patent applications Nos. 24,184/60 and 31,851/60 describes the preparation of polymeric products by the reaction of trioxan with cylic carboxylic esters which are substantially more reactive towards trioxan than are gamma-lactones. Such cyclic esters are those in which the ester ring contains at least three carbon atoms and at least one oxygen atom excluding esters having five-membered rings other than those also containing an ether linkage. Such cyclic esters can usefully be used together with aldehydes in the process of the present invention.

Our copending U.K. patent applications Nos. 40,020/60 and 8,169/61 describe the preparation of useful polymeric products from trioxan and styrene and substituted styrenes. Examples of suitable compounds which can be used in the process of that specification and which are suitable for use in the process of the present invention are styrene, alpha-substituted styrenes such as alpha-methyl styrene and alpha-phenyl styrene, ring-substituted styrenes such as o-, m- and p-methyl styrene, styrenes which are both beta- and ring-substituted such as anethole (p-methoxy beta-methyl styrene), ring-substituted styrenes in which the ring substituents are joined together to form another ring such as 1-vinyl-naphthalene and 2-vinyl-naphthalene, beta-substituted styrenes such as stilbene (beta-phenyl styrene) and beta-substituted styrenes in which the beta-substituent is linked to the phenyl ring of the styrene to form a ring such as indene, coumarone and acenaphthylene.

Our copending U.K. patent application No. 8,378/61 describes compounds which are capable of undergoing cationic polymerisation and which can be reacted in the process of the present invention with trioxan and at least one aldehyde. The compounds described in the specification of application No. 8,378/61 are vinyl compounds which are capable of copolymerising with trioxan and examples of suitable vinyl compounds are:

(1) Vinyl ethers such as methyl vinyl ether, ethyl vinyl ether, isobutyl vinyl ether and phenyl vinyl ether;
(2) N-vinyl and C-vinyl substituted derivatives of hetero-cyclic compounds such as N-vinylcarbazole and 2-vinylpyridine; and
(3) Unsaturated hydrocarbons such as isobutene, butadiene, isoprene, cyclohexene, cyclopentadiene and beta-pinene.

Our copending U.K. patent application No. 19,197/61 describes the reaction of trioxan with allyl ethers and esters and such allyl compounds are also suitable for use in the process of the present invention. Examples of suitable allyl ethers and esters are allyl acetate, allyl ethyl ether and allyl bromide.

Our copending U.K. patent application No. 21,567/61 describes the reaction of trioxan with at least one compound containing one or more isocyanate groups and such compounds are also suitable for use in the process of the present invention. Examples of suitable isocyanates are aliphatic isocyantes and aromatic isocyanates such as phenyl isocyanate and toluene 2,4-di-isocyanate.

Our copending U.K. patent application No. 21,568/61 describes the reaction of trioxan with at least one compound containing one or more nitrile groups and such compounds are also suitable for use in the process of the present invention. Particularly suitable nitriles are aliphatic saturated nitriles such as acetonitrile, adiponitrile and succinonitrile, unsatured nitriles such as acrylonitrile, aromatic nitriles such as benzonitrile and polymeric substances containing nitrile groups such as polyacrylonitrile and styrene-acrylonitrile copolymers.

As hereinbefore stated, the reaction is carried out in the presence of an electrophilic catalyst and particularly suitable electrophilic catalysts which can be used in the process of the present invention are:

(1) Metal and metalloidal fluorides, chlorides and a few bromides, belonging to the general class of catalysts which are usually effective as catalysts in the Friedel-Crafts acylation reaction. Boron trifluoride which is a gaseous catalyst and boron trichloride which is a volatile liquid are particularly suitable for processes carried out in the absence of an inert liquid medium. Such catalysts are well described in the literature, for example in the following articles or books:

N. O. Calloway, Chemical Reviews, 1935, M, 327; O. C. Dermer, D. M. Wilson, F. M. Johnson, and V. H. Dermer; J. Amer. Chem. Soc. 1941, 63, 2881; E. E. Royals, "Advanced Organic Chemistry," published by Constable, London, p. 467; G. W. Wheland, "Advanced Organic Chemistry," second edition, published by Chapman & Hall, London, 1949, pages 80, 83; and V. Migrdichan, "Organic Synthesis," published by Reinhold, New York, 1957, page 628.

Those catalysts most effective in the classical Friedel-Crafts acylating reaction are not always the best in the process of the present invention. We have found that boron trifluoride, stannic chloride and ferric chloride are particularly useful; boron trichloride, stannic bromide and other compounds which are exemplified later are also effective.

(2) Complexes of catalysts defined in (1) with water and with organic compounds in which the donor atom is oxygen or sulphur, for example alcohols, ethers, carboxylic acids or dialkyl sulphides. Useful catalysts in this range are the complexes of diethyl ether with boron trifluoride, stannic chloride, stannic bromide, boron trichloride and ferric chloride, and of boron trifluoride with acetic acid, butyl alcohol or water. When the preferred process is carried out in the presence of an inert liquid medium, it is advantageous for the catalysts to be soluble in this medium; this is particularly the case when the polymerisation is carried out at a temperature below 60° C. The complexes of boron trifluoride with higher ethers such as dibutyl and di-isoamyl ethers, which complexes are soluble in solvents such as hexane, are therefore particularly useful.

(3) Non-oxidising inorganic acids and the complexes thereof with boron trifluoride. Examples are dihydroxyfluoroboric acid, polyphosphoric acid and its complex with boron trifluoride and the complex of boron trifluoride with phosphoric acid.

(4) Complexes of boron trifluoride with very weakly basic nitrogen compounds, in which complexes the nitrogen is the donor atom. Examples are the complexes with diphenylamine and N-phenyl 1 or 2 naphthylamine and acetamide. The complexes of boron trifluoride with stronger bases such as ammonia and aliphatic amines are, however, useless as catalysts in the process of the present invention.

(5) Halogens and interhalogen compounds, for example, bromine, iodine, iodine monobromide, iodine monochloride and iodine trichloride.

(6) Oxonium salts. Examples are triethyloxonium borofluoride ($Et_3O^+BF_4^-$), triethyloxonium tetrachloroaluminate ($Et_3O^+AlCl_4^-$) and triethyloxonium hexachloroantimonate ($Et_3O^+SbCl_6^-$). These and other suitable oxonium salts may be prepared, for example, by the methods described by H. Meerwein, E. Battenberg, H. Gold, E. Pfeil and G. Willfang in J. Prakt. Chem., 1939, 154, 83–156.

The reaction is preferably effected in the presence of an inert liquid medium. This inert medium, which should be well dried, enables the reaction to be carried out in a controlled manner by ensuring uniform distribution of the catalyst and reactants and by facilitating dissipation of the heat of reaction. The use of a liquid medium is also advantageous in giving the product in the form of an easily handled slurry. The inert liquid medium may be one in which the trioxan, the aldehyde, other reactants if any, and the catalyst are dissolved at the temperature employed. One or more of the reactants (trioxan, aldehyde, other reactants and catalyst) may, however, be dispersed or partly dispersed and partly dissolved in a finely divided form in the liquid medium. Examples of suitable inert liquid media are saturated aliphatic and cycloaliphatic hydrocarbons, chlorinated aliphatic and cycloaliphatic hydrocarbons such as dichloromethane, aliphatic and aromatic nitro-hydrocarbons and carboxylic esters. Particularly advantageous results have been obtained using n-hexane which dissolves a minor proportion of the trioxan and light petroleum fractions in the hexane range which have a boiling point between 60 and 70° C. and which consist mainly of normal paraffins have also been used with success. If, however, the aldehyde and other reactants, if used, are soluble in or miscible with molten trioxan, the reaction may be effected without the use of an inert liquid medium.

The reaction may be carried out at a temperature 0° and 100° C. and preferably between 40° and 70° C. The amount of aldehyde and other reactants, if used, may vary from 0.1 to 99% by weight but the preferred amount is from 0.5 to 20% by weight of the total weight of reactants. As hereinbefore stated, the reaction must be carried out under substantially anhydrous conditions and most satisfactory results are obtained when the water content of the reaction system is less than 0.1%, preferably less than 0.05%, by weight.

As the reaction proceeds, fresh trioxan, aldehyde and other reactants, if any, may be continuously or progressively introduced into the reaction zone in which the catalyst is already present or into which the catalyst is likewise continuously or progressively introduced. If desired, the reaction can be carried out as a completely continuous process by continuously or progressively withdrawing the polymeric product which is produced.

The reaction is preferably carried out under a dry inert atmosphere such as nitrogen and/or carbon dioxide suitably at atmospheric pressure although higher pressures may be employed.

It should further be noted that some aldehydes and some other reactants may be partially polymerised prior to their reaction with the trioxan. This can conveniently be effected by partially polymerising the aldehyde in solution with the catalyst in an inert liquid medium, such as hexane, and then adding the solution of aldehyde partial polymer containing the catalyst to a dispersion of trioxan in an inert liquid medium, such as hexane. When certain other compounds capable of copolymerising with trioxan are reacted with trioxan and aldehydes in accordance with the present invention, these compounds may be partially polymerised or partially reacted with trioxan or the aldehydes prior to the introduction into the reaction zone of the other reactant or reactants. For instance, 1, 3-dioxolan may be partially polymerised with the catalyst in solution in cyclohexane or dispersed in n-hexane and the resulting solution or dispersion of the partially polymerised cyclic ether containing the catalyst then added to a solution or dispersion of trioxan and an aldehyde in an inert liquid medium such as n-hexane. The reaction of aldehydes with partially polymerised trioxan has, however, proved difficult in view of the rapidity of the polymerisation reaction of trioxan.

At the end of the reaction, an organic solvent such as acetone or dichloromethane or an aqueous solution of a complexing agent suitable for the particular metallic or metalloidal ion may be added and the polymeric product filtered off and washed with more solvent or solution. The purpose of this washing is to remove any unreacted trioxan, aldehyde, and/or other reactants which may thus be recovered, and to remove at least part of the catalyst residues.

It is important to effect a substantially complete removal of catalyst residues from the polymeric material and this removal can advantageously be carried out by reducing the polymeric product into a finely divided state suitably by ball-milling in the presence of an extraction liquid for the catalyst residues which are freed, for example, by milling. The extraction liquid may be an organic solvent, for example acetone or dichloromethane in which the catalyst dissolves, or it may be a solution of a complexing agent for the metallic or metalloidal ions of the catalyst, for example ammonia or hydrazine, or a sequestering agent. More details of the factors which govern the selection of a suitable extraction liquid and of the removal of catalyst residues are given in our copending U.K. patent application No. 30,708/61 (divisional specification of U.K. patent application No. 36,499/60) and, from that specification, it will be seen that the catalyst removal process should leave the product in either a neutral or slightly alkaline condition. It is for this reason that, if a strongly alkaline or acidic extraction liquid is used to remove the metallic or metalloidal part of the catalyst residue, it is essential to render the treated polymeric product neutral or slightly alkaline by removing all traces of acid and caustic alkali. This can conveniently be done by giving the product a final treatment with a hot dilute aqueous solution of a weak base, such as ammonia, triethanolamine, hydrazine or an amine.

The thermal stabilities of the products of the present invention as expressed by the rate of loss of weight at 222° C. ($K_{222}$) measured by the method described by Schweitzer, Macdonald and Punderson in the Journal of Applied Polymer Science, 1959, 1, 160, are such that in some cases the product can be used without further stabilisation. However, some products do require such stabilisation and others benefit by such stabilisation insofar as their initial thermal stabilities, as determined by the percentage loss of weight during the first 30 minutes of heating at 222° C., are improved. It is important for the products to have a high initial thermal stability if they are to be moulded for satisfactory mouldings to be obtained by conventional moulding processes.

Such further stabilisation of the products can be obtained by incorporating therein substances which react with any free end groups and typically reactive substances for this purpose are identified in U.K. patent specification No. 557,873 and include acid anhydrides and isocyanates. The products of the present invention are preferably stabilised by the incorporation therein of antioxidants for example aromatic amines, such as N-phenyl-1-naphthylamine, N-phenyl-2-naphthylamine, diphenylamine and di-2-naphthyl-p-phenylene-diamine, ultra-violet light-absorbings, they may possess the disadvantage to a varying degree as 2,2′-dihydroxy-4,4′-dimethoxy-benzophenone and 2-hydroxy-4-methoxy-benzophenone; and substances capable of reacting with formaldehyde, for example hydrazines, ureas and thioureas such as ethylene urea and phenyl thiourea, phenols such as 2-methyl-4,6-di-tert-butyl phenol and polyamines.

Further stabilisation of the products may be effected by by the incorporation therein of a polymeric substance containing —CO—NH— groups in accordance with the process described in our co-pending U.K. patent application No. 7,938/61. Examples of suitable polymeric substances which can be used for this purpose are polyamides, polyurethanes, polyureas, polyacrylamides and polypeptides.

Although the polymeric products stabilised by the above methods can usefully be used for the production of plastic moulding compositions, films, fibres and protective coatings, they may possess the disadvantage to a varying degree of evolving gas during normal injection moulding. This liberation of gas causes the formation of bubbles and faults in moulded products and, in order to avoid this evolution of gas, it is advantageous to give the product a heat treatment in accordance with the process described in our co-pending U.K. patent application No. 36,499/60. Full details of the conditions which should be used for this heat treatment are given in the last mentioned copending application but, by way of example, it may be mentioned that it is generally satisfactory to heat the product in an oven at atmospheric pressure in an atmosphere of nitrogen or another inert gas for 10 to 20 minutes at a temperature of 220° C.

The products of the present invention are useful industrial products and exhibit a wide range of properties which vary depending upon the nature of the aldehyde and on the relative proportions of the aldehyde, other reactants, if any, and the trioxan in the product; those products which contain a large proportion of trioxan resemble polyoxymethylenes. Many of these polymeric products are useful in the manufacture of plastic moulding compositions, films, fibres and protective coatings and, for such applications, the products may be mixed with lubricants, fillers and pigments in addition to the antioxidants and stabilisers hereinbefore mentioned.

This invention is illustrated by the following examples in which the thermal decomposition rates ($K_{222}$) were determined by the method described by Schweitzer et al. in the aforementioned journal and in which the inherent viscosities are as measured at 60° C. as 0.5% solutions in p-chlorophenol containing 2% alpha-pinene.

*Example 1*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of dry trioxan, 6 g. of chloral and 400 g. of commercial hexane (B.P. 66–68° C.). The water content of the reaction mixture was less than 0.01% by weight as determined by the Karl Fischer method. The reaction mixture was then heated to 60° C. in an atmosphere of dry nitrogen and, to the rapidly agitated mixture, 0.5 ml. of boron trifluoride-diethyl etherate was added. Polymerisation took place rapidly and the temperature rose to 67° C.

The reaction mixture was then cooled and 500 ml. of acetone and 10 ml. of triethylamine were added. The resultant product was ball-milled overnight with about 1 litre of an approximately 2% aqueous ammonia solution, then filtered, slurried once in two litres of hot distilled water containing about 0.3% by weight $NH_3$ and finally air-dried.

There were obtained 450 g. of a product, which on moulding at 175° C., gave a tough and flexible film having a thermal decomposition rate ($K_{222}$) of 0.5% per minute.

*Example 2*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of dry trioxan, and 400 g. of commercial hexane (B.P. 66–68° C.). The water content of the clear mixture was less than 0.01% by weight, as determined by the Karl Fischer method. The reaction mixture was then heated to 60° C. in an atmosphere of dry nitrogen and, to the rapidly agitated mixture, 6 g. of acetaldehyde and 0.5 ml. of boron trifluoride-diethyl-etherate were added. Polymerisation took place rapidly and the temperature rose to 64° C.

The reaction mixture was then cooled and 500 ml. of acetone and 10 ml. of triethylamine were added. The resultant product was ball-milled overnight with about 1 litre of an approximately 2% aqueous ammonia solution, then filtered, slurried once in two litres of hot distilled water containing about 0.3% by weight $NH_3$ and finally air-dried.

There were obtained 380 g. of a polymeric product.

*Example 3*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of benzaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 430 g. of a polymeric product having an inherent viscosity of 0.89 which on moulding at 190° C. gave a flexible film having a thermal decomposition rate ($K_{222}$) of 2.0% per minute.

Example 4

A 2 litre reaction flask fitted with a thermometer, a stirrer, a gas inlet and outlet and a condenser was heated to remove any moisture which was present and then cooled in a stream of pure dry nitrogen. In the flask, there were then charged 600 g. of trioxan, 400 g. of commercial hexane (B.P. 66–68° C.) and 12 g. of anisaldehyde. The water content of the reaction mixture was less than 0.01% by weight, as determined by the Karl Fischer method.

The reaction mixture was then heated to 60° in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 510 g. of a polymeric product having an inherent viscosity of 1.24 which on moulding at 190° C. gave a flexible film having a thermal decomposition rate ($K_{222}$) of 0.48% per minute.

After the addition of 3% ethylene urea and 0.1% N-phenyl-1-naphthylamine each by weight, the thermal decomposition rate of the product was decreased to 0.33% per minute. After heating the product at 200° C. for 20 minutes, the thermal decomposition rate was further decreased to 0.25% per minute.

Example 5

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of carbon tetrachloride and 12 g. of anisaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 80° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 520 g. of a polymeric product which on moulding at 190° C. gave a brittle film.

Example 6

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of cyclohexane and 12 g. of cinnamaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 72° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 450 g. of a polymeric product having an inherent viscosity of 1.47 which on moulding at 190° C. gave a flexible film having a thermal decomposition rate ($K_{222}$) of 1.10% per minute.

Example 7

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of piperonaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 510 g. of a polymeric product having an inherent viscosity of 1.77 which on moulding at 190° C. gave a flexible film having a thermal decomposition rate ($K_{222}$) of 0.57% per minute.

After the addition of 3% ethylene urea and 0.1% N-phenyl-1-naphthylamine each by weight, the thermal decomposition rate of the product was decreased to 0.35% per minute. After heating the product at 200° C. for 20 minutes, the thermal decomposition rate was further decreased to 0.25% per minute.

Example 8

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of piperonaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 g. of triethyloxonium borofluoride was added. The temperature rose rapidly to 66° C. and the polymerization was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum of 60° C.

There were obtained 500 g. of a polymeric product having an inherent viscosity of 1.44 which on moulding at 190° C. gave a flexible film having a thermal decomposition rate ($K_{222}$) of 0.30% per minute.

*Example 9*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of piperonaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of dihydroxyfluoroboric acid was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filled, washed twice with 2000 ml. of distilled water, slurried twice with 2000 ml. of acetone and finally dried under a vacuum at 60° C.

There were obtained 400 g. of a polymeric product which on moulding at 190° C. gave a flexible film having a thermal decomposition rate ($K_{222}$) of 0.60% per minute.

*Example 10*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 15 g. of furfural. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 480 g. of a polymeric product having an inherent viscosity of 1.17 which on moulding at 190° C. gave a flexible film having a thermal decomposition rate ($K_{222}$) of 1.10% per minute.

After the addition of 3% ethylene urea and 0.1% N-phenyl-1-naphthylamine, each by weight, the thermal decomposition rate of the product was decreased to 0.60% per minute. After heating the product at 200° C. for 20 minutes, the thermal decomposition rate was further decreased to 0.45% per minute.

*Example 11*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of crotonaldehyde. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under a vacuum at 60° C.

There were obtained 450 g. of a polymeric product having an inherent viscosity of 1.27 which on moulding at 190° C. gave a flexible film having a thermal decomposition rate ($K_{222}$) of 0.75% per minute.

*Example 12*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.), 5 g. of anisaldehyde and 10 g. of 1,2-dioxolan. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 490 g. of a polymeric product having an inherent viscosity of 1.12 which on moulding at 190° C. gave a flexible film having a thermal decomposition rate ($K_{222}$) of 0.15% per minute.

After the addition of 3% ethylene urea and 0.1% N-phenyl-1-naphthylamine, each by weight, the thermal decomposition rate of the product was decreased to 0.11% per minute. After heating the product at 200° C. for 20 minutes, the thermal decomposition rate was further decreased to 0.09% per minute.

*Example 13*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.), 12 g. of piperonaldehyde and 8 g. of styrene. The water content of the reaction mixture was less than 0.01% by weight, as determined by the Karl Fischer method.

The reaction mixture was then heated to 60° C. in an atmosphere of dry nitrogen and, to the rapidly agitated mixture, 1 ml. of boron trifluoride-diethyl etherate was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 510 g. of a polymeric product which on moulding at 190° C. gave a partially flexible film having a thermal decomposition rate ($K_{222}$) of 0.25% per minute.

*Example 14*

A 2 litre reaction flask fitted with a thermometer, a stirrer, a gas inlet and outlet and a condenser was heated to remove any moisture which was present and then cooled in a stream of pure dry nitrogen. Into the flask, there were then charged with 600 g. of trioxan, 400 g. of commercial hexane (B.P. 66–68° C.) and 9 g. of chloral. The water content of the reaction mixture was less than 0.01% by weight, as determined by the Karl Fischer method.

The reaction mixture was then heated to 60° C. in an atmosphere of dry nitrogen and, to the rapidly agitated mixture, 1 g. of boron trifluoride/N-phenyl-1-naphthylamine complex was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 550 g. of a polymeric product which on moulding at 190° C. gave a tough flexible film having a thermal decomposition rate ($K_{222}$) of 0.73% per minute.

*Example 15*

A 2 litre reaction flask fitted with a thermometer, a stirrer, a gas inlet and outlet and a condenser was heated to remove any moisture which was present and then cooled in a stream of pure dry nitrogen. Into the flask, there were then charged 600 g. of trioxan, 400 g. of commercial hexane (B.P. 66–68° C.) and 12 g. of anisaldehyde. The water content of the reaction mixture was less than 0.01% by weight, as determined by the Karl Fischer method.

The reaction method was then heated to 60° C. in an atmosphere of dry nitrogen and, to the rapidly agitated mixture 1 g. of triethyloxonium borofluoride dissolved in 1 g. of nitroethane was added. The temperature rose rapidly to 66° C. and the polymerisation was continued for 20 minutes and the temperature was then allowed to fall to less than 60° C.

To the agitated polymer suspension, 250 ml. of acetone and 50 ml. of triethylamine were then added. The polymeric product was then filtered and ball-milled for 16 hours with about 2 litres of an approximately 2% aqueous ammonia solution. The product was then filtered and heated with agitation for about 30 minutes at 80–90° C. in a reactor fitted with a stirrer and a condenser with about 2 litres of an approximately 2% aqueous ammonia solution.

The product was then filtered, washed twice with 2000 ml. of distilled water, slurried twice with 2000 ml. of acetone and finally dried under vacuum at 60° C.

There were obtained 420 g. of a polymeric product which on moulding at 190° C. gave a partially flexible film.

What we claim is:

1. A process for the preparation of a copolymer which comprises reacting trioxan with an aldehyde that yields a copolymer having at least 2 carbon atoms under substantially anhydrous conditions and in the presence of an electrophilic catalyst.

2. A process as claimed in claim 1 in which (1) trioxan is reacted with (2) an aldehyde and (3) a styrene in the presence of an electrophilic catalyst.

3. A process as claimed in claim 1 in which trioxan is reacted with an aldehyde and a compound capable of copolymerizing with trioxan in the presence of an electrophilic catalyst, the compound being selected from the group consisting of a cyclic ether, a vinyl compound, an allyl ether and an allyl ester.

4. A process as claimed in claim 1 in which (1) trioxan is reacted with (2) an aldehyde selected from the group consisting of chloral, anisaldehyde, benzaldehyde, (3) cinnamaldehyde, and styrene.

5. A process as claimed in claim 1 in which the reaction is carried out in an inert dry atmosphere.

6. A process as claimed in claim 1 in which the reaction is carried out in a dry atmosphere of nitrogen.

7. A process as claimed in claim 1 in which the reaction is carried out in a carbon dioxide atmosphere.

8. A process as claimed in claim 1 in which the reaction is carried out in the presence of an inert liquid medium.

9. A process as claimed in claim 8 in which the liquid medium is a light petroleum fraction in the hexane range, which has a boiling point between 60° and 70° C. and which consists mainly of normal paraffins.

10. A process as claimed in claim 1 in which the reaction is carried out at a temperature between 0° C. and 100° C.

11. A process as claimed in claim 1 in which the electrophilic catalyst is selected from the group consisting of metal and metalloidal halides in which the halide is a halogen of lower atomic weight than iodine, complexes of said metal and metalloidal halides with a complexing agent selected from the group consisting of water, an organic compound having an oxygen donor atoms, and an organic compound having a sulphur donor atom.

12. A process as claimed in claim 1 in which the (1) trioxan is reacted with (2) an aldehyde and (3) styrene, the catalyst is boron trifluoride and the reaction is carried out in a continuous manner, at a temperature between 0° and 100° C., in a substantially inert dry atmosphere, and in the presence of a substantially inert liquid medium.

13. A process as set forth in claim 1 in which the catalyst is a trialkyl oxonium borofluoride.

14. A process as set forth in claim 1 in which the aldehyde comprises 0.5 to 20% by weight of the reactants.

15. A copolymer whenever produced by the process claimed in claim 1.

16. A copolymer as claimed in claim 15 in which styrene is an additional copolymerizing compound.

References Cited by the Examiner

UNITED STATES PATENTS

| | | | |
|---|---|---|---|
| 2,989,509 | 6/1961 | Hudgin et al. | 260—67 |
| 3,012,990 | 12/1961 | Kray et al. | 260—67 |
| 3,026,299 | 3/1962 | Kray et al. | 260—67 |
| 3,027,352 | 3/1962 | Walling et al. | 260—67 |
| 3,067,174 | 12/1962 | Sullivan | 260—67 |
| 3,067,175 | 12/1962 | Sullivan | 260—67 |
| 3,076,786 | 2/1963 | Brown et al. | 260—73 |
| 3,087,913 | 4/1963 | Kray et al. | 260—73 |

FOREIGN PATENTS

| | | |
|---|---|---|
| 876,956 | 9/1961 | Great Britain. |
| 620,872 | 5/1961 | Italy. |

OTHER REFERENCES

Bevington et al., Proceedings of the Royal Society (London), vol. A196 (1949), 363–378 (pages 366 and 377 relied on).

Novak et al., Faraday Society Transactions, 55 441 (September 1959), pp. 1490–99.

Kern et al. (2), International Symposium on Makromolekulare Chem., June 14–18, 1960, Moscow, U.S.S.R. Papers and Summaries, Section II, pp. 280–285.

Chemical Abstracts, 54,10931i, June 10, 1960.

Derwent Belgian Patent Report, No. 72A, February 10, 1961, PC8, For. Pat. Jor.

Kern et al., Angerwandte Chemie, 73, No. 6, March 21, 1961, 177–186.

Shorygina et al., J. Applied Chemistry, U.S.S.R., 33, 252, 254, 1960.

Hohr et al., Die Makromeleculare Chemie, 52, 59–69, April 18, 1962.

WILLIAM H. SHORT, *Primary Examiner.*

HAROLD BURSTEIN, *Examiner.*

L. M. MILLER, H. D. ANDERSON,
*Assistant Examiners.*

UNITED STATES PATENT OFFICE
CERTIFICATE OF CORRECTION

Patent No. 3,272,780                                      September 13, 1966

Walter Wilson et al.

It is hereby certified that error appears in the above numbered patent requiring correction and that the said Letters Patent should read as corrected below.

Column 12, lines 41 and 42, strike out "an aldehyde that yields a copolymer having at least 2 carbon atoms" and insert instead -- an aldehyde having at least 2 carbon atoms that yield a copolymer --; line 57, for "(3) cinnamaldehyde, and styrene" read -- cinnamaldehyde, and (3) styrene --.

Signed and sealed this 29th day of August 1967.

(SEAL)
Attest:

ERNEST W. SWIDER                                      EDWARD J. BRENNER
Attesting Officer                                           Commissioner of Patents